(12) United States Patent
Willis et al.

(10) Patent No.: US 9,651,977 B2
(45) Date of Patent: May 16, 2017

(54) THREE-PHASE POWER CONVERSION WITH POWER FACTOR CORRECTION OPERATIONAL DAY AND NIGHT

(71) Applicant: HIQ SOLAR, INC., Santa Clara, CA (US)

(72) Inventors: Andre P. Willis, Palo Alto, CA (US); Clinton A. Fincher, Sunnyvale, CA (US)

(73) Assignee: HiQ Solar, Inc., Santa Clara, CA (US)

( * ) Notice: Subject to any disclaimer, the term of this patent is extended or adjusted under 35 U.S.C. 154(b) by 394 days.

(21) Appl. No.: 14/206,389

(22) Filed: Mar. 12, 2014

(65) Prior Publication Data

US 2015/0015216 A1     Jan. 15, 2015

Related U.S. Application Data

(60) Provisional application No. 61/782,429, filed on Mar. 14, 2013.

(51) Int. Cl.
| | |
|---|---|
| *G05F 1/70* | (2006.01) |
| *H02M 7/5387* | (2007.01) |
| *H02J 3/18* | (2006.01) |
| *H02M 3/28* | (2006.01) |
| *H02M 1/00* | (2006.01) |

(52) U.S. Cl.
CPC .............. *G05F 1/70* (2013.01); *H02J 3/1842* (2013.01); *H02M 7/53873* (2013.01); *H02M 3/28* (2013.01); *H02M 2001/007* (2013.01); *Y02E 40/22* (2013.01)

(58) Field of Classification Search
None
See application file for complete search history.

(56) References Cited

U.S. PATENT DOCUMENTS

| | | | |
|---|---|---|---|
| 5,278,490 A | 1/1994 | Smedley | |
| 5,467,294 A * | 11/1995 | Hu | G06F 1/0328 327/106 |
| 6,072,302 A * | 6/2000 | Underwood | H02J 3/38 322/17 |
| 7,012,505 B1 * | 3/2006 | Arden | H04B 3/56 340/538.11 |
| 8,624,436 B2 | 1/2014 | Willis | |
| 2004/0062058 A1 | 4/2004 | Hann et al. | |

(Continued)

FOREIGN PATENT DOCUMENTS

| | | |
|---|---|---|
| KR | 10-2010-0033656 | 3/2010 |
| WO | 0013285 A2 | 3/2000 |

OTHER PUBLICATIONS

International Search Report and Written Opinion in PCT/US2014/026165 issued on Jul. 21, 2014, 9 pages.

(Continued)

*Primary Examiner* — Timothy J Dole
*Assistant Examiner* — Monica Mata
(74) *Attorney, Agent, or Firm* — Fountainhead Law Group P.C.

(57) ABSTRACT

System and method for controlling power factor correction (PFC) for three-phase AC power conveyed via a three-phase AC power grid. Currents and voltages on the grid are monitored and used to generate waveform data enabling dynamic control of switching circuitry used in controlling one or more phase offsets between the currents and voltages.

18 Claims, 9 Drawing Sheets

(56) References Cited

U.S. PATENT DOCUMENTS

2005/0017695 A1   1/2005   Stanley
2007/0058401 A1   3/2007   Tan et al.
2007/0253223 A1   11/2007  Neidorff et al.

OTHER PUBLICATIONS

E. Troester; New German Grid Codes for Connecting PV Systems to the Medium Voltage Power Grid; 2nd International Workshop on Concentrating Photovoltaic Power Plants: Optical Design, Production, Grid Connection; pp. 1-4; Germany.
P. Mantovanelli Barbosa; Dissertation submitted to the Faculty of the Virginia Polytechnic Institute and State University entitled Three-Phase Power Factor Correction Circuits for Low-Cost Distributed Power Systems; Jul. 31, 2002; pp. 1-245; Blacksburg, VA.
L. Moran, J. Dixon, R. Wallace; A Three-Phase Active Power Filter Operating with Fixed Switching Frequency for Reactive Power and Current Harmonic Compensation; IEEE Transactions on Industrial Electronics; Aug. 1995; pp. 402-408; vol. 42, No. 4.
Wikipedia; Definition of atan2; pp. 1-7.
Extended European Search Report dated Dec. 6, 2016 for EP Appln. 14774479.1; 8 pages.

* cited by examiner

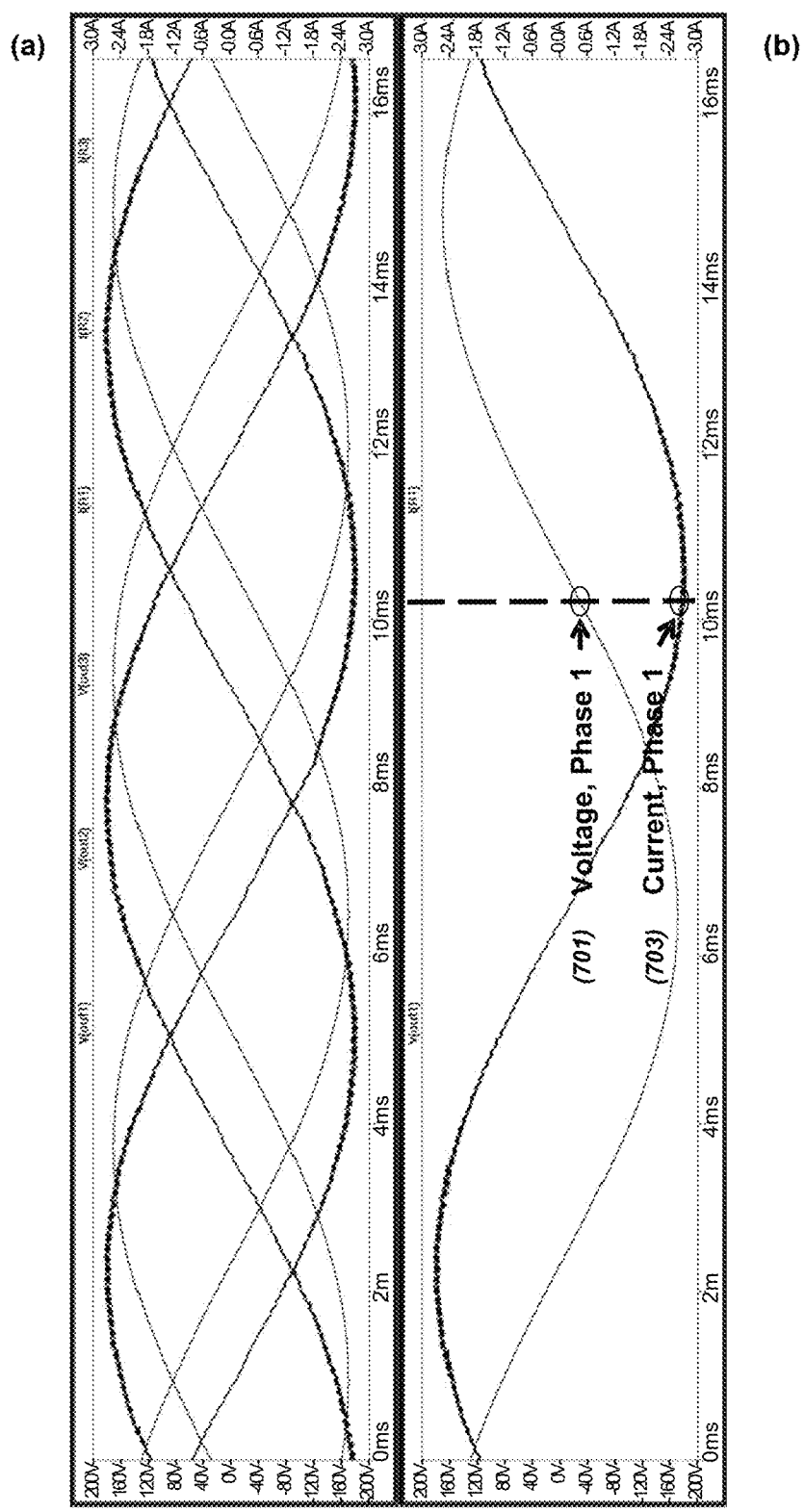
FIG. 7 (A) to (B)

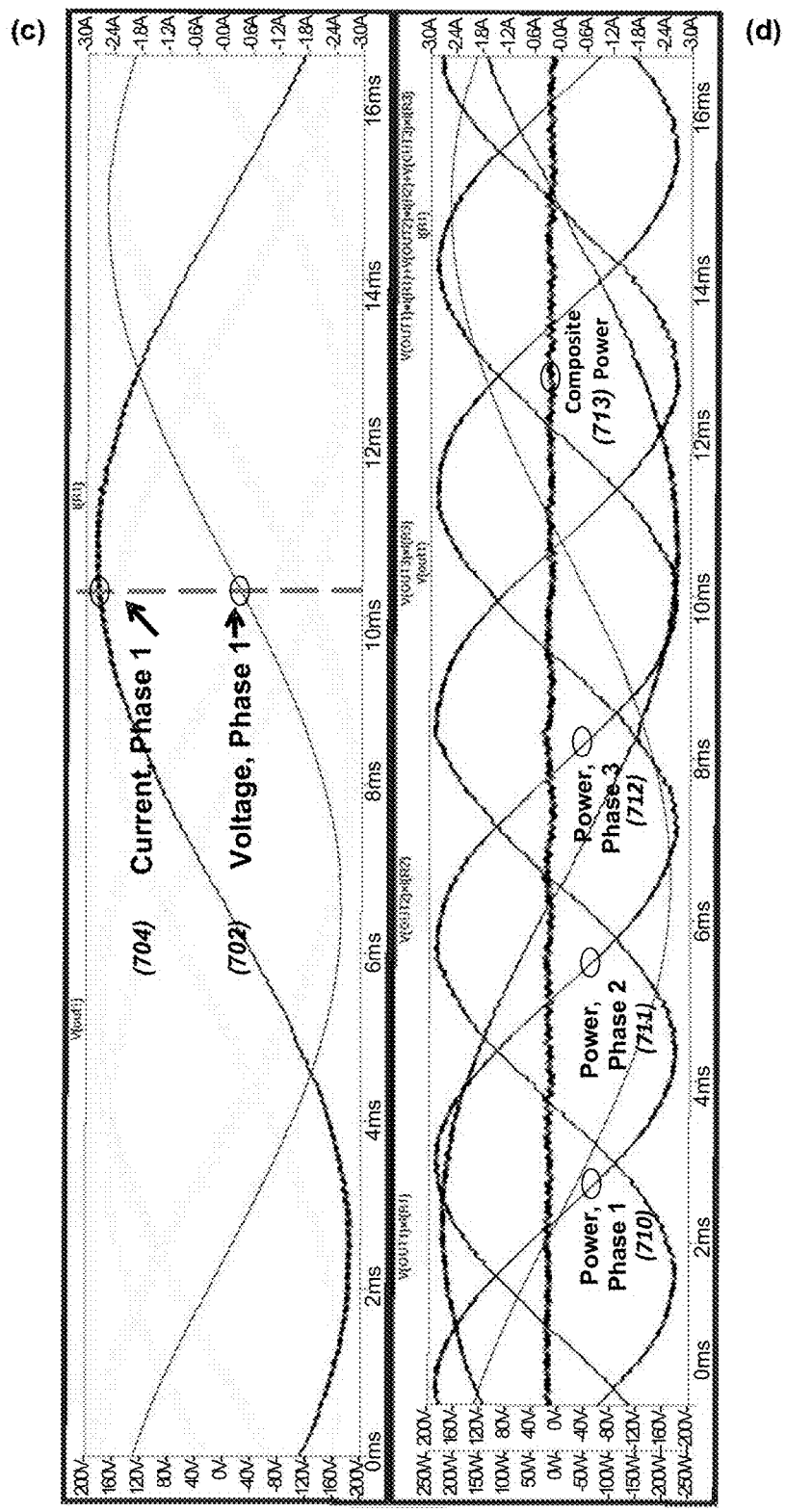
FIG. 7 (C) to (D)

THREE-PHASE POWER CONVERSION WITH POWER FACTOR CORRECTION OPERATIONAL DAY AND NIGHT

RELATED APPLICATIONS

This application claims priority to and the benefit of U.S. Patent Application 61/782,429, entitled "Three-phase Power Conversion with Power Factor Correction Operational Day and Night," which was filed on Mar. 14, 2013, the disclosure of which is incorporated herein by reference.

BACKGROUND

Reactive power is a significant issue for power providers as it reduces real power delivery and increases power loss. Systems that can correct for reactive power are of increasing interest. Regulations are emerging in some countries to oblige large power generation plants such as utility-scale solar installations to introduce specified amounts of corrective reactive power when instructed to do so.

One method of introducing corrective reactive power (or Power Factor Correction) is to switch in large banks of reactive components such as capacitors. An alternative approach is to use active electronics to introduce reactive power. It is common to use a 3-phase H-bridge to produce 3-phase reactive power.

SUMMARY

In accordance with the presently claimed invention, a system and method are provided for controlling power factor correction (PFC) for three-phase AC power conveyed via a three-phase AC power grid. Currents and voltages on the grid are monitored and used to generate waveform data enabling dynamic control of switching circuitry used in controlling one or more phase offsets between the currents and voltages.

In accordance with one embodiment of the presently claimed invention, a system for controlling power factor correction (PFC) for three-phase AC power having a power signal frequency and one or more voltage-current (V-I) phase offsets, comprising:

frequency control logic responsive to a plurality of data by providing frequency control data, by processing at least one of initial frequency data and aggregate phase data for the three-phase AC power with
  first measured power data related to respective phases of one of voltage and current of the three-phase AC power, and
  synthesized frequency data corresponding to the power signal frequency;

frequency synthesizer logic coupled to the frequency control logic and responsive to the frequency control data by providing the synthesized frequency data;

phase control logic coupled to the frequency synthesizer logic and responsive to another plurality of data by providing phase control data, by processing at least one of initial phase offset data and desired phase offset data for the three-phase AC power with the synthesized frequency data and second measured power data related to another of the voltage and current of the three-phase AC power; and waveform synthesizer logic coupled to the phase control logic and responsive to the phase control data by providing synthesized waveform data corresponding to respective phases of the three-phase AC power.

In accordance with another embodiment of the presently claimed invention, a method for controlling power factor correction (PFC) for three-phase AC power having a power signal frequency and one or more voltage-current (V-I) phase offsets, comprising logic circuitry programmed to:

respond to a plurality of data by providing frequency control data, by processing at least one of initial frequency data and aggregate phase data for the three-phase AC power with
  first measured power data related to respective phases of one of voltage and current of the three-phase AC power, and
  synthesized frequency data corresponding to the power signal frequency;

respond to the frequency control data by providing the synthesized frequency data;

respond to another plurality of data by providing phase control data, by processing at least one of initial phase offset data and desired phase offset data for the three-phase AC power with the synthesized frequency data and second measured power data related to another of the voltage and current of the three-phase AC power; and respond to the phase control data by providing synthesized waveform data corresponding to respective phases of the three-phase AC power.

In accordance with another embodiment of the presently claimed invention, a method for controlling power factor correction (PFC) for three-phase AC power having a power signal frequency and one or more voltage-current (V-I) phase offsets, comprising:

responding to a plurality of data by providing frequency control data, by processing at least one of initial frequency data and aggregate phase data for the three-phase AC power with
  first measured power data related to respective phases of one of voltage and current of the three-phase AC power, and
  synthesized frequency data corresponding to the power signal frequency;

responding to the frequency control data by providing the synthesized frequency data;

responding to another plurality of data by providing phase control data, by processing at least one of initial phase offset data and desired phase offset data for the three-phase AC power with the synthesized frequency data and second measured power data related to another of the voltage and current of the three-phase AC power; and responding to the phase control data by providing synthesized waveform data corresponding to respective phases of the three-phase AC power.

BRIEF DESCRIPTION OF THE DRAWINGS

FIG. 7(a) depicts voltage and current waveforms for the 3 phases.

FIGS. 7(b) and 7(c) depict examinations of phase 1 with two different values of desired PFC phase offset.

FIG. 7(d) depicts powers of the 3 phases.

DETAILED DESCRIPTION

As discussed in more detail below, exemplary embodiments of the presently claimed invention provide control for a standard 3-phase H-bridge to enable: generation of reactive AC 3-phase power from a power conversion system using a novel control, and production of reactive power independently of whether the system is making DC to AC power conversion or not.

Architecture

Figure 1:
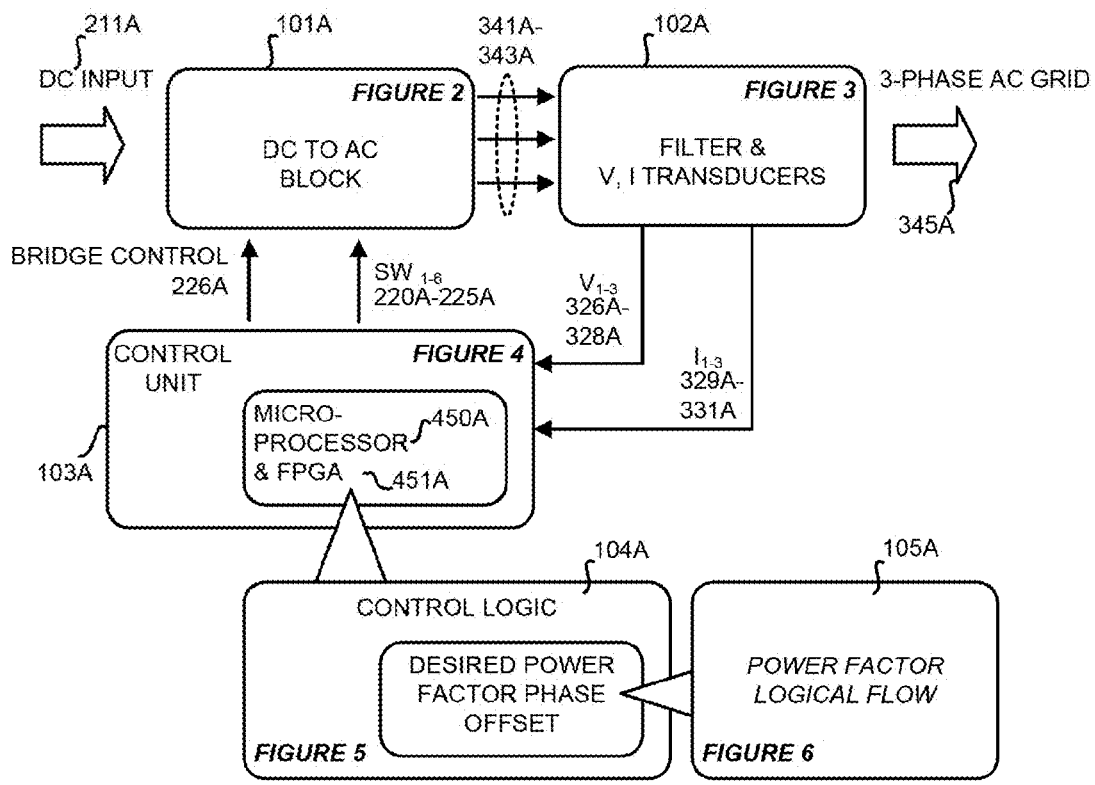
FIG. 1 depicts an overall architectural for a system for power factor correction in accordance with exemplary embodiments of the presently claimed invention.

The overall approach is shown in overview form in FIG. 1. A DC input (211A), for example from an array of solar panels or batteries, is converted from DC to AC (101A), filtered and measured (102A), and controlled (103A) to produce power suitable for the 3-phase AC electrical grid (345A). This system is capable of Power Factor Correction (PFC).

Figure 2:
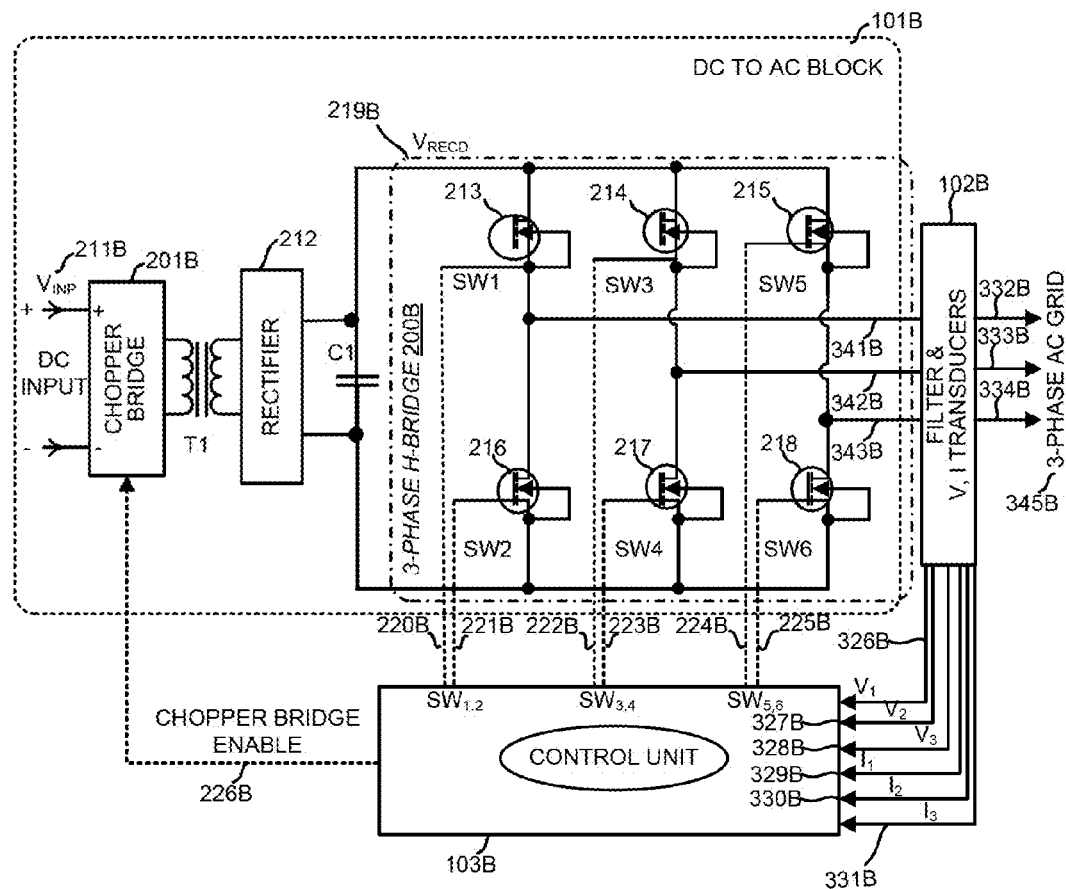
FIG. 2 depicts a DC to AC Block suitable for use in the system of FIG. 1.

In a previous patent application (U.S. Patent Publication 2010/0308660, the contents of which are incorporated herein by reference) we detailed a power conversion scheme where a preferred implementation is partly reproduced here as FIG. 2. This shows the DC to AC Block (101B) in detail, and refers to the Filter & V, I Transducer Block (102B) (detailed in FIG. 3) and the Control Unit block (103B) (detailed in FIG. 4).

Figure 5:
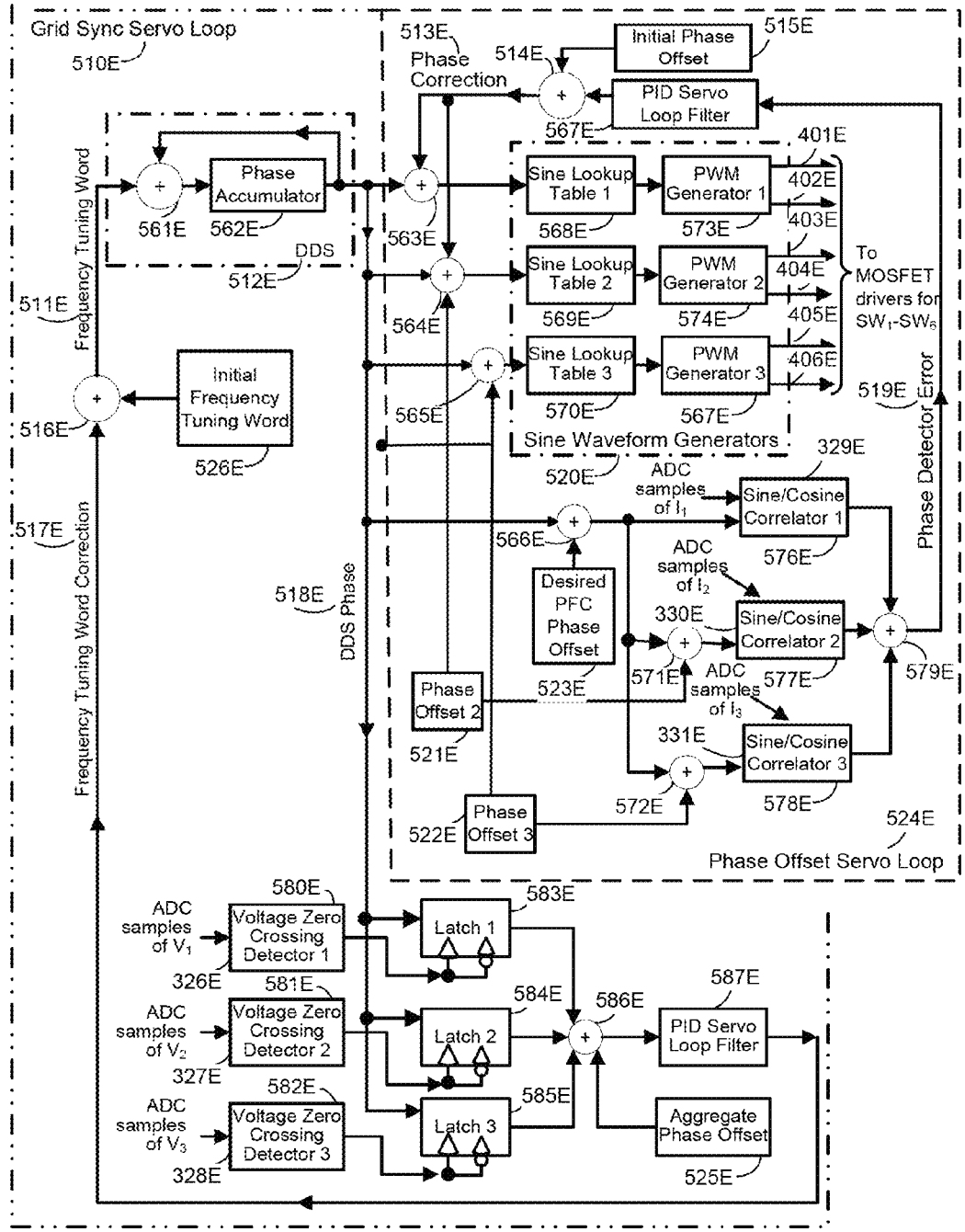
FIG. 5 depicts a logic diagram for implementing the Control Unit in the system of FIG. 1 in accordance with exemplary embodiments of the presently claimed invention.
Figure 6:
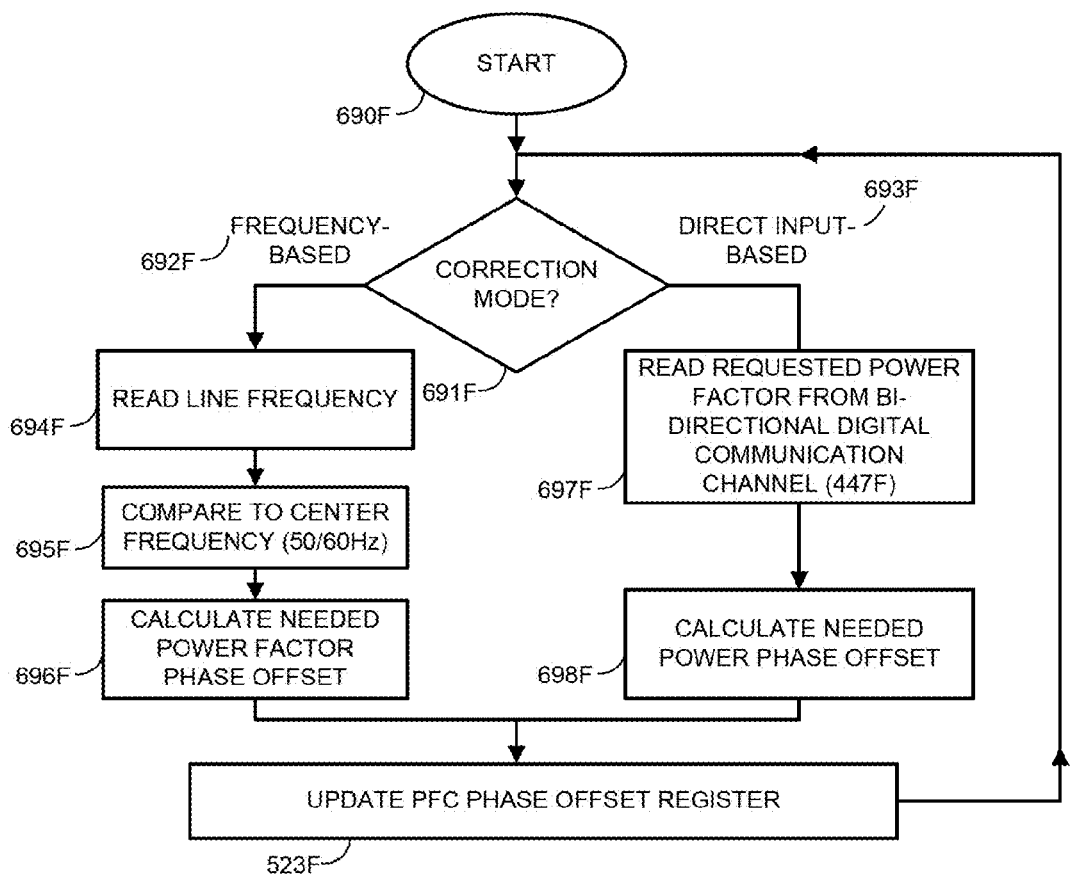
FIG. 6 depicts a logical flow for Power Factor Correction control in accordance with exemplary embodiments of the presently claimed invention.

Control of the system is novel, and is detailed in FIG. 5. An advantageous aspect of the invention is an ability to take instruction on the amount and type (leading or lagging) of power factor correction to apply independently of whether the system is making a DC to AC conversion or not; a logical flow detailing this is shown in FIG. 6.

The DC to AC Block is described in detail in the previous patent application[v].

Figure 3:
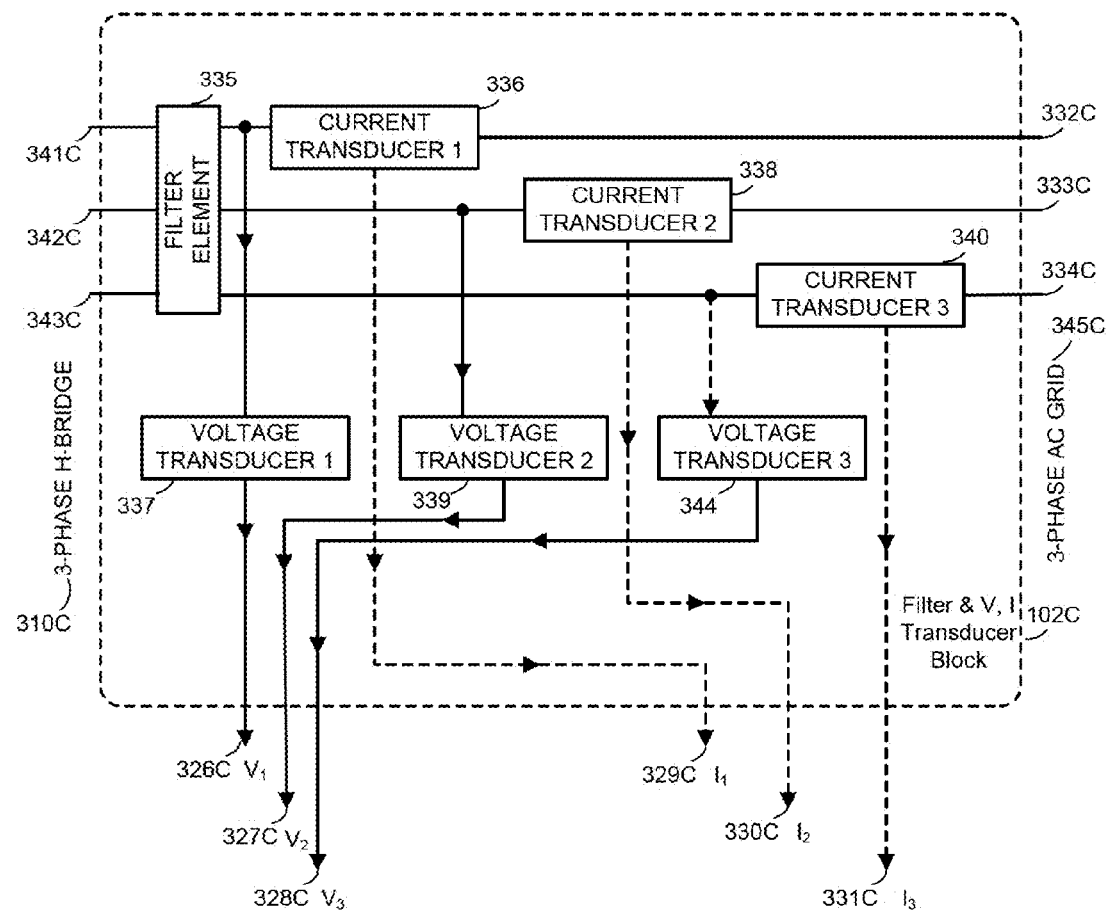
FIG. 3 depicts a Filter Block and Voltage and Current Transducer Blocks suitable for use in the system of FIG. 1.

In FIG. 3: 3-phase voltages (341C, 342C, 343C) from the DC to AC Block (101A, 101B) enter the Filter Element (335). The Filter Element (335) is comprised of an energy storage inductor and optional smoothing capacitor, and an optional LC low pass filter, per phase. Each output of the Filter Element is connected to a voltage transducer (337, 339, 344) and a current transducer (336, 338, 340). The output of each current transducer (336, 338, 340) connects (332C, 333C, 334C) to the 3-phase AC grid (345C). Voltage transducer measurement outputs (326C, 327C, 328C) and current transducer measurement outputs (329C, 330C, 331C) connect to the control block (103A, 103D).

Figure 4:
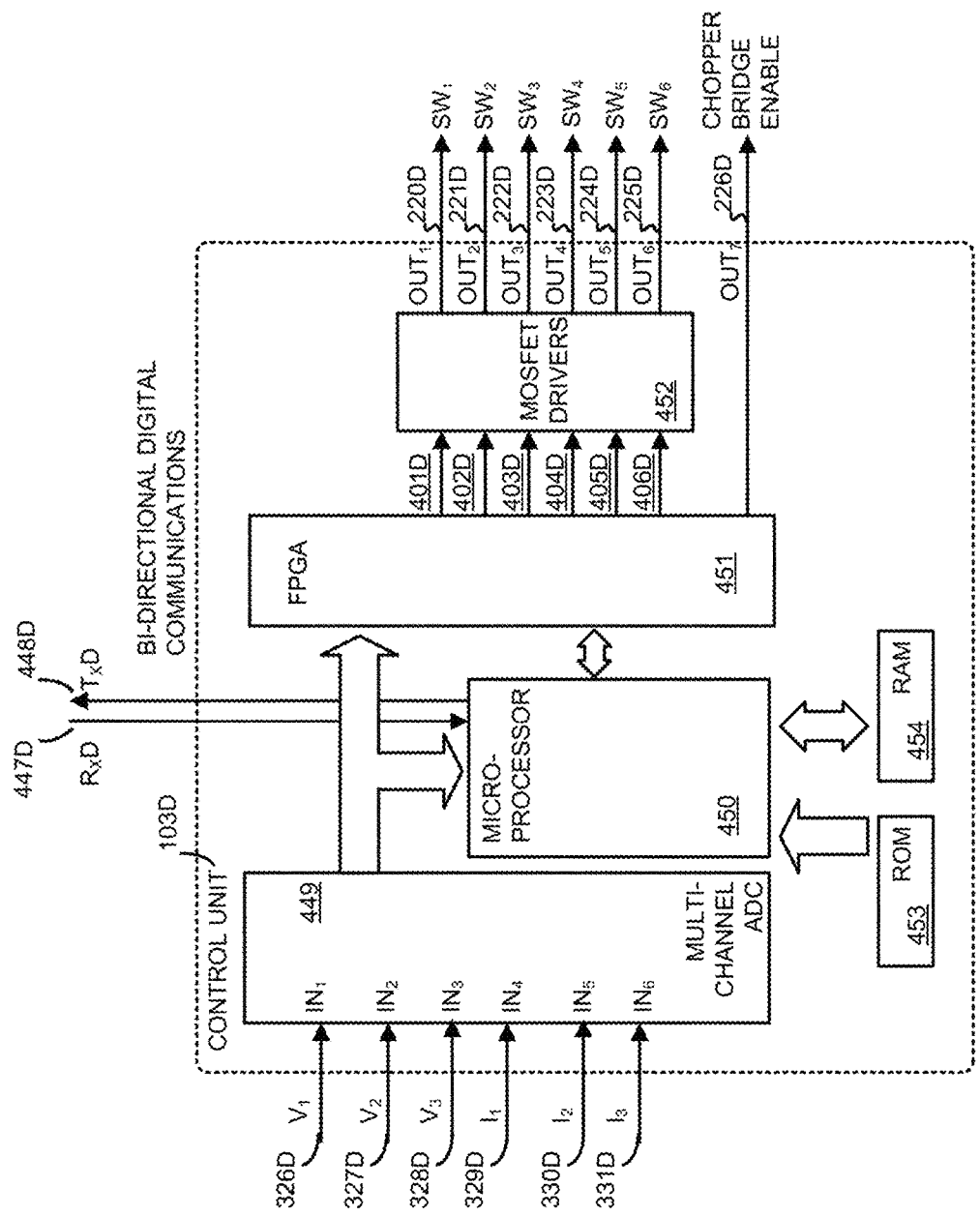
FIG. 4 depicts a Control Unit suitable for use in the system of FIG. 1.

The Control Unit (103D) is detailed in FIG. 4: Voltage transducer measurement outputs $V_1$, $V_2$, $V_3$, (326D, 327D, 328D) are connected to inputs $In_1$, $In_2$, $In_3$ of the multi-channel ADC (449). Current transducer measurement outputs $I_1$, $I_2$, $I_3$ (329D, 330D, 331D) are connected to inputs $In_4$, $In_5$, $In_6$ of the same multi-channel ADC (449). The output of the multichannel ADC is connected to the micro-processor (450) and the FPGA (451).

The micro-processor (450) has ROM (453) and RAM (454) and is capable of bi-directional digital communication (447, 448). The micro-processor (450) is connected to the multi-channel ADC (449) and the FPGA (451).

The FPGA (451) receives digitized measurement data from the multi-channel ADC (449). It is connected to the micro-processor (450). The Chopper Bridge (201B in FIG. 2) is controlled by the FPGA (451) using output $Out_7$ (226B, 226D); the Chopper Bridge (201B) is turned on when the converter is generating and off when the converter is not making a DC to AC power conversion. The FPGA is connected (401D-406D) to MOSFET drivers (452). The MOSFET drivers (452) drive switches $SW_1$-$SW_6$ (213-218 in FIG. 2) through outputs $Out_1$-$Out_6$ (220D-225D).

The FPGA (451) and micro-processor (450) have a global clock (not shown) that times all internal operations.

In FIG. 5 the control logic used by the control unit (103D in FIG. 4) is shown. The control logic is implemented in the micro-processor (450) and FPGA (451) in the preferred implementation. It could be implemented entirely in the micro-processor (450) or entirely in the FPGA (451), the exact apportionment of tasks is an implementation detail not material to the overall control.

In the block diagram of FIG. 5, a variety of functional blocks are connected together to form the Direct Digital Synthesis block (DDS) (512E) and Sine Waveform Generators (520E), controlled by the Grid Sync Servo Loop (510E) and Phase Offset Servo Loop (524E) respectively.

DDS Block

DDS is formed by an adder (561E) and phase accumulator (562E). The output of the phase accumulator (562E) is connected to one input of the adder (561E). The other input of the adder (561E) receives the frequency tuning word (511E). The output of the adder (561E) is connected to the input of the phase accumulator (562E). The output of the phase accumulator (562E) is called DDS Phase (518E).

Grid Sync Servo Loop Block

Digitized measurement data from voltage transducers $V_1$, $V_2$, $V_3$ (326E, 327E, 328E) provide inputs to Voltage Zero Crossing Detectors 1, 2, 3 (580E, 581E, 582E) each of which provide clock to Latch 1, 2, 3 (583E, 584E, 585E). The data input to each latch is connected to DDS Phase (518E). The outputs of latches (583E, 584E, 585E) connect to three inputs of an adder (586E). The fourth input of the adder (586E) is connected to the Aggregate Phase Offset Register (525E). The output of the adder (586E) connects to a Proportional-Integral-Derivative (PID) Servo Loop Filter (587E), the output of which generates the Frequency Tuning Word Correction (517E).

The Frequency Tuning Word Correction (517E) feeds an adder (516E). The other input of the adder (516E) is connected to the Initial Frequency Tuning Word register (526E). The output of the adder (516E) is called the Frequency Tuning Word (511E) and feeds an input of an adder (561E).

Phase Offset Servo Loop Block

DDS Phase (518E) is connected to the input of an adder (563E). Phase Correction (513E) is applied to the other input of the adder (563E). DDS Phase (518E) is also connected to an input of adders (564E, 565E). A second input on each adder (564E, 565E) is connected to Phase Correction (513E). The third input of each adder (564E, 565E) is connected to the output of Phase Offset registers 2, 3 (521E, 522E) respectively.

The output of each adder (563E, 564E, 565E) is connected to the input of Sine Lookup Table 1, 2, 3 (568E, 569E, 570E) respectively. The output of each Sine Lookup Table (568E, 569E, 570E) feeds the input of PWM Generator 1, 2, 3 (573E, 574E, 567E) respectively. The Sine Lookup Tables (568E, 569E, 570E) together with the PWM Generators (573E, 574E, 567E) form Sine Waveform Generators (520E). The outputs of the PWM Generators (401E to 406E) are connected to the MOSFET drivers (452) that connect to switches $SW_1$ to $SW_6$ (FIG. 4).

DDS phase (518E) feeds the input of an adder (566E). The second input of the adder (566E) connects to the Desired PFC Phase Offset Register (523E). The output of the adder (566E) connects to a Sine/Cosine Correlator (576E, discussed in more detail below). The other input of the Sine/Cosine Correlator (576E) receives digitized samples of measurement data from current transducer $I_1$ (329E). The output of the adder (566E) also connects to inputs of two adders (571E, 572E). The second input of each adder (571E, 572E) connects to Phase Offset 2 (521E) and Phase Offset 3 (522E) registers respectively. The outputs of these adders (571E, 572E) connect to the input of Sine/Cosine Correlator 2 (577E) and 3 (578E) respectively. The outputs of the three Sine/Cosine Correlators (576E, 577E, 578E) feed an adder (579E). The output of the adder (579E) is called the Phase Detector Error (519E).

The Phase Detector Error (519E) feeds the input of a PID Servo Loop Filter (567E). The output of the PID Servo Loop Filter (567E) feeds an adder (514E). The second input of the adder (514E) is connected to the Initial Phase Offset register (515E). The output of the adder (514E) is called the Phase Correction (513E).

Grid Sync Servo Loop

The DDS Phase word (518E) is generated by the DDS (512E) where the Phase Accumulator (562E) gets added to itself and the Frequency Tuning Word (511E). The Frequency Tuning Word (511E) is the sum of the Initial Frequency Tuning Word (526E) and the Frequency Tuning Word Correction (517E). The Frequency Tuning Word Correction (517E) is generated as follows: DDS Phase (518E) gets latched by Latches 1, 2, 3 (583E, 584E, 585E) for phases 1, 2, 3 respectively, during every zero voltage crossing which are supplied by Voltage Zero Crossing Detectors 1, 2, 3 (580E, 581E, 582E). Outputs of Latches 1, 2, 3 (583E, 584E, 585E) get combined into composite phase offset by an adder (586E) along with the Aggregate Phase Offset (525E). The output of the adder (586E) is proportional to a mismatch of timing between the AC grid voltage zero crossings and the DDS Phase (518E). This output gets filtered by the PID (proportional-integral-derivative) Servo Loop Filter to produce the Frequency Tuning Word Correction (517E). The Frequency Tuning Word Correction is fed back to the DDS forming a negative feedback loop, which keeps the DDS phase and frequency synchronous to the AC grid.

Phase Offset Servo Loop

DDS Phase (518E) word gets added to the phase correction word (513E) and applied to the Sine lookup table 1 (568E), which provides a value to the PWM Generator 1 (573E). The PWM Generator 1 (573E) generates duty-cycle modulated signals to drive the 3-phase H-bridge switches ($SW_1$-$SW_2$) through MOSFET drivers (401E to 402E) (see FIG. 4). Phases 2 and 3 are done the same way but Phase Offsets 2, 3 (521E, 522E) are added (564E, 565E) to the inputs of Sine Lookup Tables 2, 3 (569E, 570E). Phase Correction (513E) is generated as follows: DDS Phase gets added (566E) to Desired PFC Phase Offset (523E) which provides the phase reference input to Sine/Cosine Correlator 1 (576E). The input of Sine/Cosine Correlator 1 (576E) gets digitized measurement data from current transducer $I_1$ (329E). Other phases 2, 3 are done the same way but the Phase Offsets 2, 3 (521E, 522E) are added (571E, 572E) to the phase reference inputs of Sine/Cosine Correlators 2, 3 (577E, 578E). Outputs of all three Sine/Cosine Correlators get added together by an adder (579E) and produce the Phase Detector Error (519E). The Phase Detector Error (519E) is proportional to a mismatch between the Desired PFC Phase Offset (523E) and the phase offset being generated by the power converter and measured by the current transducers ($I_1$, $I_2$, $I_3$, 329E, 330E, 331E). This is fed back to Sine Waveform Generators (520E) forming a negative feedback loop, keeping the generated output current phase shift equal to the Desired PFC Phase Offset (523E).

Phase Offset 2, 3 (521E, 522E) provide a benefit that the order of phases of the 3-phase output of the power converter (332B, 333B, 334B) may be altered during power-up time; this enables a user to connect the power converter to the AC grid with the three phases in any order, the power converter then adjusts the values in the registers Phase Offset 2, 3 (521E, 522E) to adapt. This is accomplished by the micro-processor (450) in the following way: Phase 1 (580E) is taken as the reference. The phases of phase 2 and 3 are compared to DDS Phase (518E) in Latches 2, 3 (584E, 585E) with Phase Offset registers (521E, 522E) at default values and the error measured. The register (521E, 522E) values are then swapped and the errors measured. The register (521E, 522E) values that gave the lowest error are then used as the correct ones.

The reactive power factor value may be set using the Desired PFC Phase Offset register (523E). The logical flow controlling this is shown in FIG. 6. Two methods are described in the preferred implementation, one that sets a direct value externally (693F) by reading it from the Bi-directional Digital Communications connection (447). The other (692F) makes the amount of power factor applied dependent on the line frequency of the AC grid. The grid frequency is read by the micro-processor (450) from the frequency tuning word (511E). This method accommodates situations where the grid frequency changes to communicate that a generation plant needs to apply set amounts of correction.

Power Factor Correction

A preferred implementation of the architecture described in the previous section produces the 3-phase AC voltage and current waveforms shown in FIG. 7(a). The thinner line of each color represents the voltage of each phase; the thicker line of the same color represents current.

The traces of phase 1 are used as an example in FIGS. 7(b) and (c). The voltage waveform (701, 702) is identical between pictures (b) and (c). The current waveform (703, 704) in each case is different—the phase relationship has been changed between voltage and current from 90 degrees lagging to 90 degrees leading, which means that the power factor has been changed.

Plots (b) and (c) document a change from leading to lagging current due to a sign change if Desired PFC Phase Offset (523E) value.

FIG. 7(d) shows the power delivered into each phase (710, 711, 712). In this case the power converter is not generating power, but instead is steering power between phases. This is evidenced by the composite power (713), which is near zero. The process is not lossless, which accounts for the composite power not being exactly zero.

The architecture described in this invention and in the previous patent is unique to be able to provide power conversion (for example as a solar inverter) and to also provide power factor correction through novel control. In addition it is able to provide power factor correction when the converter is not making a DC to AC power conversion (FIG. 7(d)), for example at night when the power converter applied as part of a solar system. It is able to provide variable amounts of correction (FIG. 6) within the current handling capabilities of the H-bridge. Unlike dedicated systems for the generation of reactive power, this invention does not require additional power circuitry beyond that already in use for power conversion.

Figure 8:
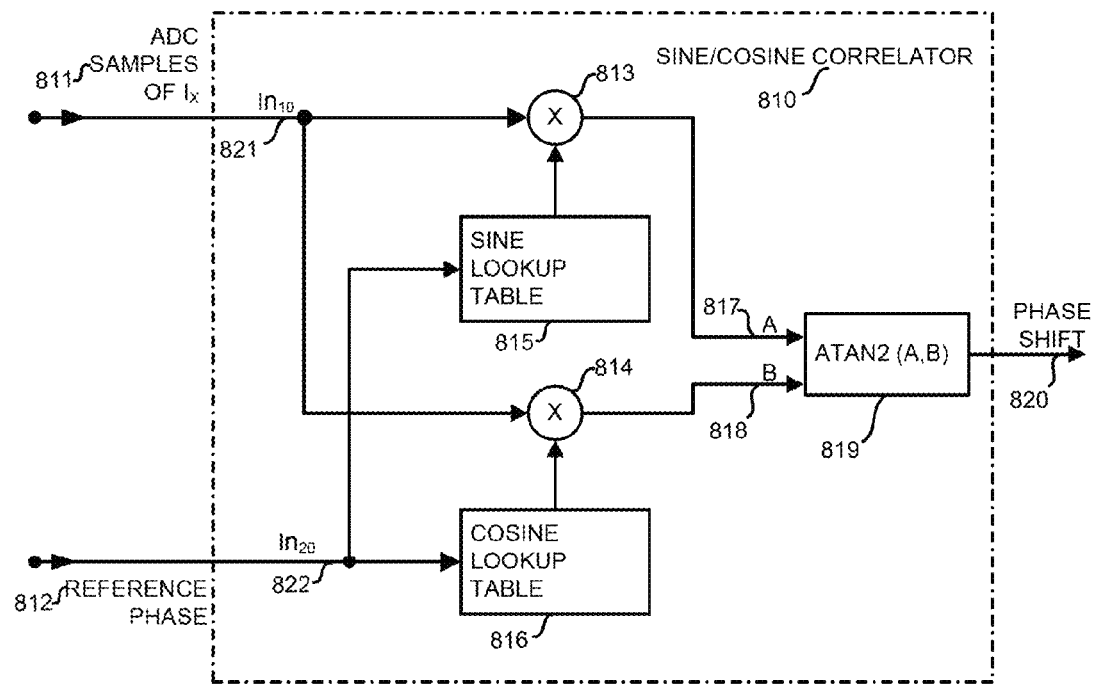
FIG. 8 depicts Sine/Cosine Correlator logic suitable for use in the logic of FIG. 5.

Referring to FIG. 8, Sine/Cosine Correlators used in the preferred implementation can be executed as shown. The function of the Sine/Cosine Correlator (810) is to determine the phase shift between two inputs. In this implementation ADC samples of current from Current Transducers $I_1$, $I_2$ or $I_3$ (329C, 330C, 331C in FIG. 3) feed input $In_{10}$ (821). The second input, $In_{20}$ (822) is a reference phase word. Input $In_{10}$ (821) feeds one input of each of two multipliers (813, 814). The second input of each multiplier is connected to the output of a lookup table, Sine Lookup Table (815) and Cosine Lookup Table (816). Input $In_{20}$ (822) feeds the input of each lookup table (815, 816). The output of each multiplier (813, 814) connects to the 'a' (817) and 'b' (818) inputs of the A tan 2 block (819) respectively. The A tan 2 block (820) outputs the phase shift (820) between inputs $In_{10}$ (821) and $In_{20}$ (822). Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a system for controlling power factor correction (PFC) for three-phase AC power having a power signal frequency and one or more voltage-current (V-I) phase offsets, comprising: frequency control logic responsive to a plurality of data by providing frequency control data, by processing at least one of initial frequency data and aggregate phase data for said three-phase AC power with first measured power data related to respective phases of one of voltage and current of said three-phase AC power, and synthesized frequency data corresponding to said power signal frequency; frequency synthesizer logic coupled to said frequency control logic and responsive to said frequency control data by providing said synthesized frequency data; phase control logic coupled to said frequency synthesizer logic and responsive to another plurality of data by providing phase control data, by processing at least one of initial phase offset data and desired phase offset data for said three-phase AC power with said synthesized frequency data and second measured power data related to another of said voltage and current of said three-phase AC power; and waveform synthesizer logic coupled to said phase control logic and responsive to said phase control data by providing synthesized waveform data corresponding to respective phases of said three-phase AC power, wherein said phase control logic selectively operates in one of a plurality of correction modes, wherein said plurality of correction modes includes a frequency-based mode and a direct input-based mode, wherein in said frequency-based mode, said phase control logic reads a line frequency, compares said line frequency to a center frequency, and calculates a needed power factor phase offset based on comparing said line frequency and said center frequency.

2. The apparatus of claim 1, wherein said frequency control logic, frequency synthesizer logic, phase control logic and waveform synthesizer logic together comprise at least one of a microprocessor and a programmable gate array.

3. The apparatus of claim 1, wherein said frequency control logic comprises:
   a plurality of latches responsive to said first measured power data by latching said synthesized frequency data to provide latched frequency data;
   combining logic responsive to at least said latched frequency data by providing combined frequency data; and
   filter logic responsive to said combined frequency data by providing filtered frequency data.

4. The apparatus of claim 1, wherein said frequency synthesizer logic comprises a direct digital synthesizer.

5. The apparatus of claim 1, wherein said phase control logic comprises:
   first combining logic responsive to at least said synthesized frequency data and said desired phase offset data by providing combined phase data;
   correlation logic responsive to said combined phase data and said second measured power data by providing correlated phase data;
   filter logic responsive to said correlated phase data by providing filtered phase data; and
   second combining logic responsive to at least said synthesized frequency data and said filtered phase data by providing said phase control data.

6. The apparatus of claim 1, wherein said waveform synthesizer logic comprises a lookup table responsive to said phase control data by providing said synthesized waveform data.

7. An apparatus including a programmable system for controlling power factor correction (PFC) for three-phase AC power having a power signal frequency and one or more voltage-current (V-I) phase offsets, comprising logic circuitry programmed to: respond to a plurality of data by providing frequency control data, by processing at least one of initial frequency data and aggregate phase data for said three-phase AC power with first measured power data related to respective phases of one of voltage and current of said three-phase AC power, and synthesized frequency data corresponding to said power signal frequency; respond to said frequency control data by providing said synthesized frequency data; respond to another plurality of data by providing phase control data, by processing at least one of initial phase offset data and desired phase offset data for said three-phase AC power with said synthesized frequency data and second measured power data related to another of said voltage and current of said three-phase AC power; and respond to said phase control data by providing synthesized waveform data corresponding to respective phases of said three-phase AC power, wherein said logic circuitry programmed to respond to said another plurality of data selectively operates in one of a plurality of correction modes, wherein said plurality of correction modes includes a frequency-based mode and a direct input-based mode, wherein in said frequency-based mode, said phase control logic reads a line frequency, compares said line frequency to a center frequency, and calculates a needed power factor phase offset based on comparing said line frequency and said center frequency.

8. The apparatus of claim 7, wherein said logic circuitry comprises at least one of a microprocessor and a programmable gate array.

9. The apparatus of claim 7, wherein said logic circuitry is programmed to respond to a plurality of data by providing frequency control data by:
responding said first measured power data by latching said synthesized frequency data to provide latched frequency data;
combining at least said latched frequency data to provide combined frequency data; and
filtering said combined frequency data to provide filtered frequency data.

10. The apparatus of claim 7, wherein said logic circuitry is programmed to respond to said frequency control data by providing said synthesized frequency data by direct digital synthesis.

11. The apparatus of claim 7, wherein said logic circuitry is programmed to respond to another plurality of data by providing phase control data by:
combining at least said synthesized frequency data and said desired phase offset data to provide combined phase data;
correlating said combined phase data and said second measured power data to provide correlated phase data;
filtering said correlated phase data to provide filtered phase data; and
combining at least said synthesized frequency data and said filtered phase data to provide said phase control data.

12. The apparatus of claim 7, wherein said logic circuitry is programmed to said phase control data by providing synthesized waveform data by accessing a lookup table with said phase control data to provide said synthesized waveform data.

13. A method for controlling power factor correction (PFC) for three-phase AC power having a power signal frequency and one or more voltage-current (V-I) phase offsets, comprising: responding to a plurality of data by providing frequency control data, by processing at least one of initial frequency data and aggregate phase data for said three-phase AC power with first measured power data related to respective phases of one of voltage and current of said three-phase AC power, and synthesized frequency data corresponding to said power signal frequency; responding to said frequency control data by providing said synthesized frequency data; responding to another plurality of data by providing phase control data, by processing at least one of initial phase offset data and desired phase offset data for said three-phase AC power with said synthesized frequency data and second measured power data related to another of said voltage and current of said three-phase AC power; and responding to said phase control data by providing synthesized waveform data corresponding to respective phases of said three-phase AC power, wherein said responding to said another plurality of data includes selectively operating in one of a plurality of correction modes, wherein said plurality of correction modes includes a frequency-based mode and a direct input-based mode, wherein in said frequency-based mode, said phase control logic reads a line frequency, compares said line frequency to a center frequency, and calculates a needed power factor phase offset based on comparing said line frequency and said center frequency.

14. The method of claim 13, wherein said responding to a plurality of data, responding to said frequency control data, said responding to another plurality of data and said responding to said phase control data together comprise processing said data with at least one of a microprocessor and a programmable gate array.

15. The method of claim 13, wherein said responding to a plurality of data by providing frequency control data comprises:
responding to said first measured power data by latching said synthesized frequency data to provide latched frequency data;
combining at least said latched frequency data to provide combined frequency data; and
filtering said combined frequency data to provide filtered frequency data.

16. The method of claim 13, wherein said responding to said frequency control data by providing said synthesized frequency data comprises direct digital synthesizing.

17. The method of claim 13, wherein said responding to another plurality of data by providing phase control data comprises:
combining at least said synthesized frequency data and said desired phase offset data to provide combined phase data;
correlating said combined phase data and said second measured power data to provide correlated phase data;
filtering said correlated phase data to provide filtered phase data; and
combining at least said synthesized frequency data and said filtered phase data to provide said phase control data.

18. The method of claim 13, wherein said responding to said phase control data by providing synthesized waveform data corresponding to respective phases of said three-phase AC power comprises accessing a lookup table with said phase control data to provide said synthesized waveform data.

* * * * *